Sept. 17, 1946.  J. B. ARMITAGE ET AL  2,407,913
MACHINE TOOL TRANSMISSION AND CONTROL MECHANISM
Filed Feb. 23, 1942  9 Sheets-Sheet 6
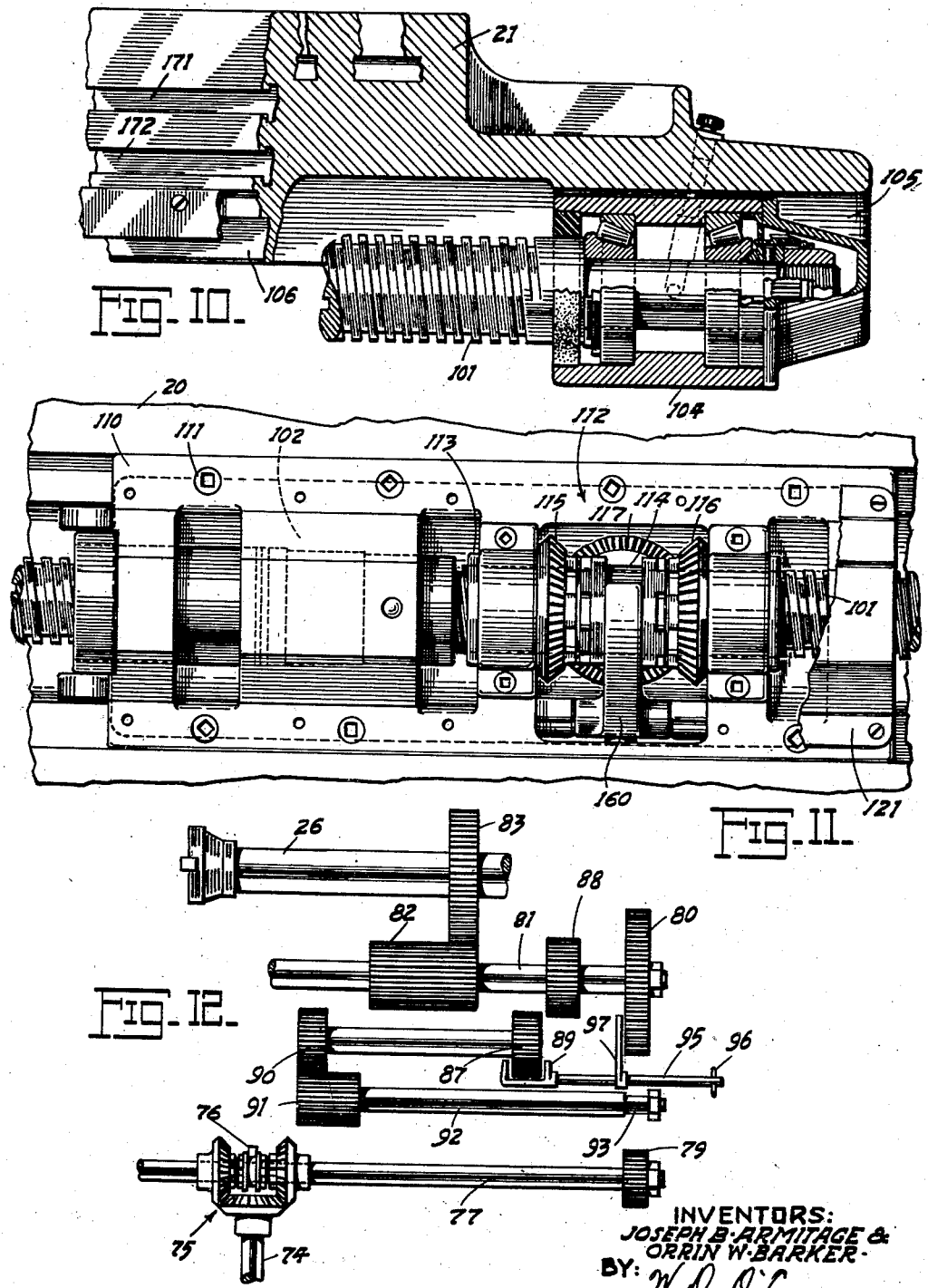
INVENTORS:
JOSEPH B. ARMITAGE &
ORRIN W. BARKER
BY: W. D. O'Connor
ATTORNEY.

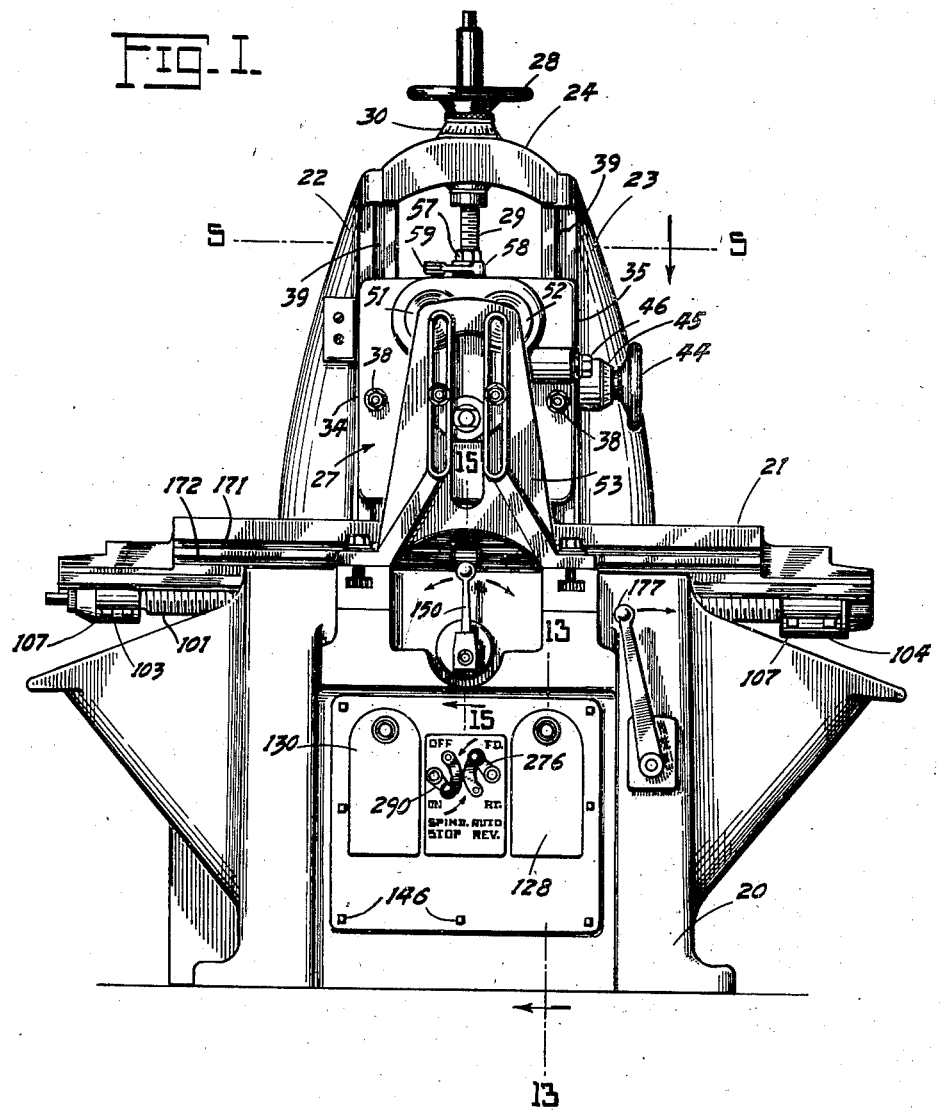

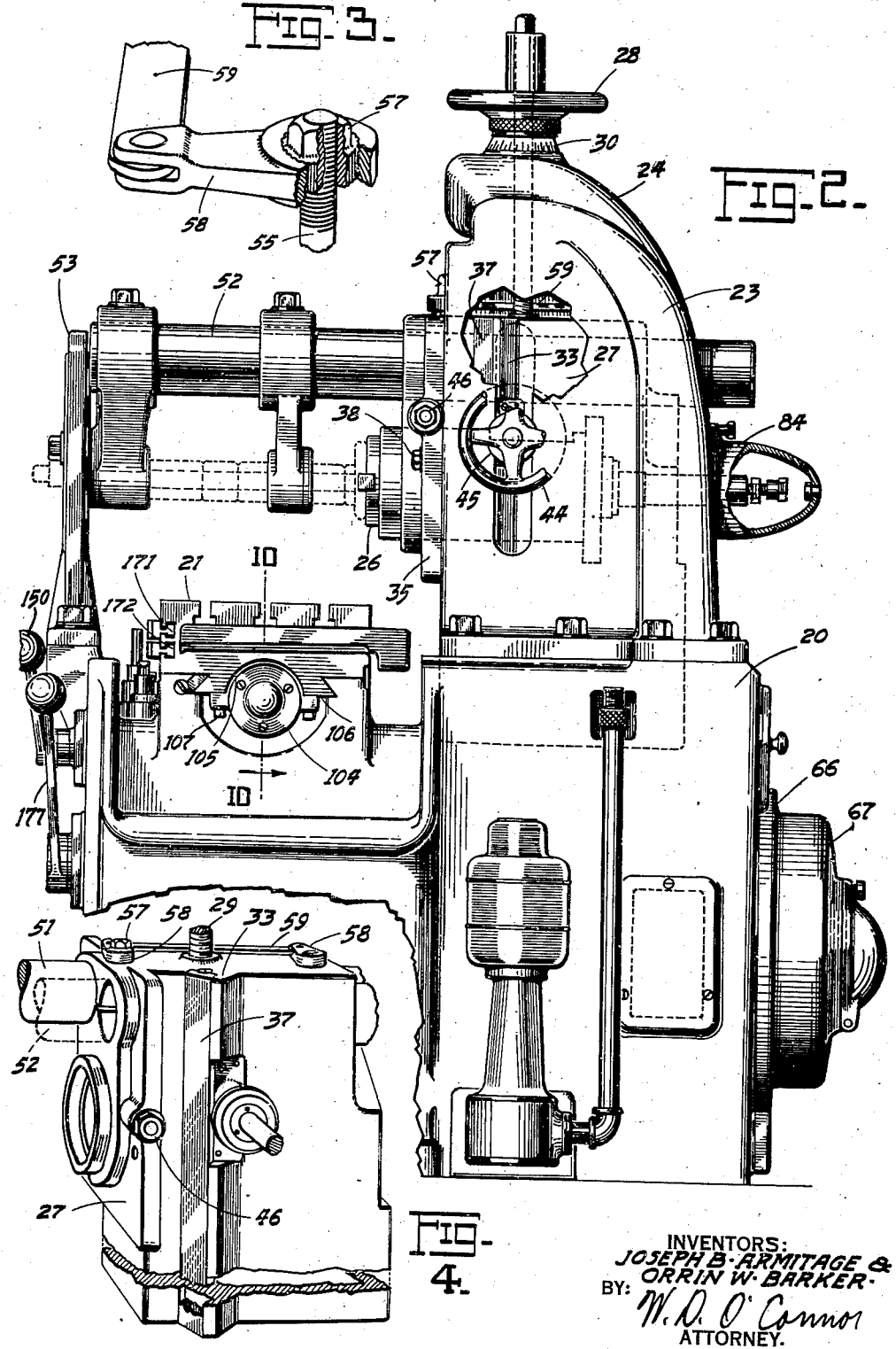

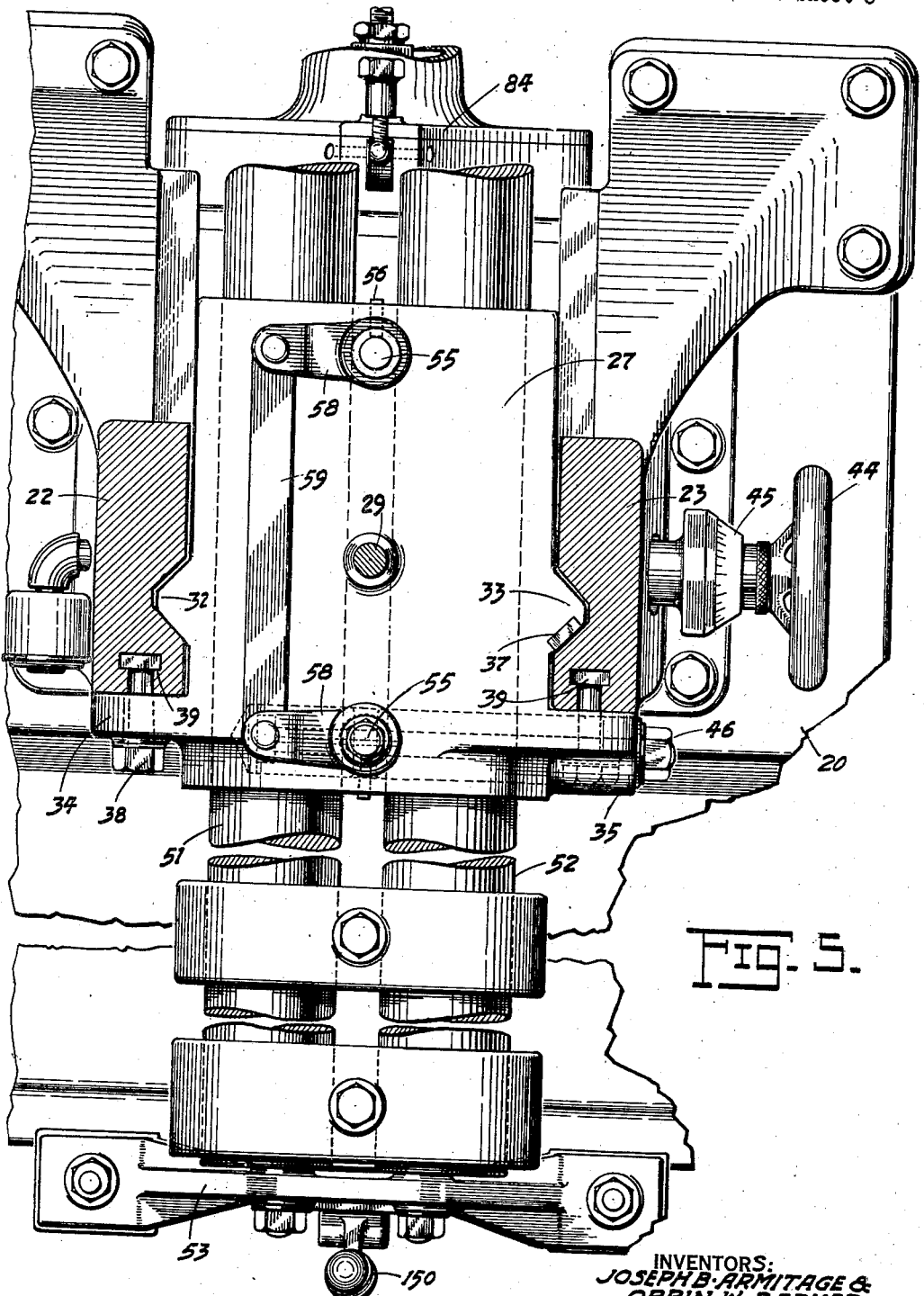

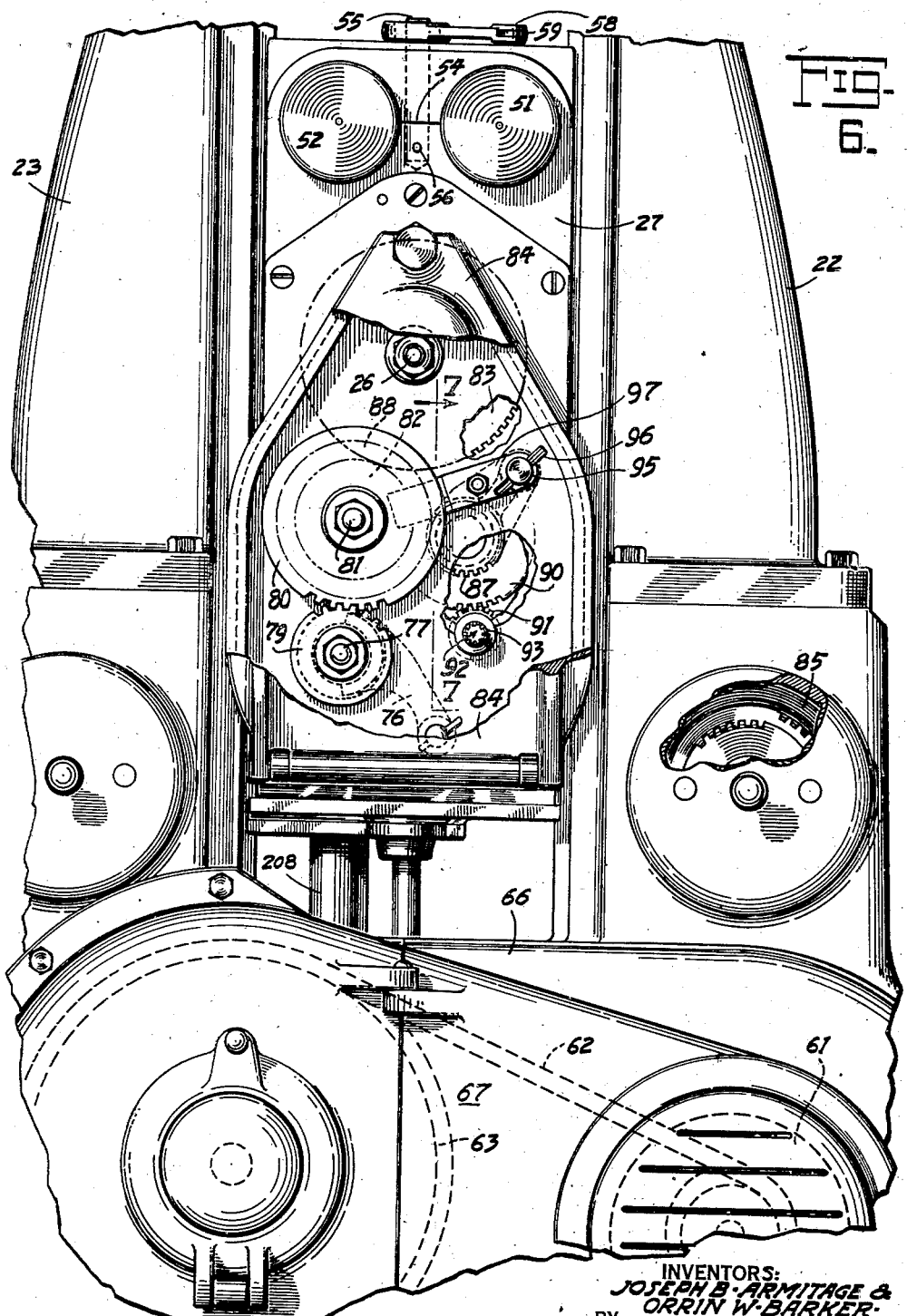

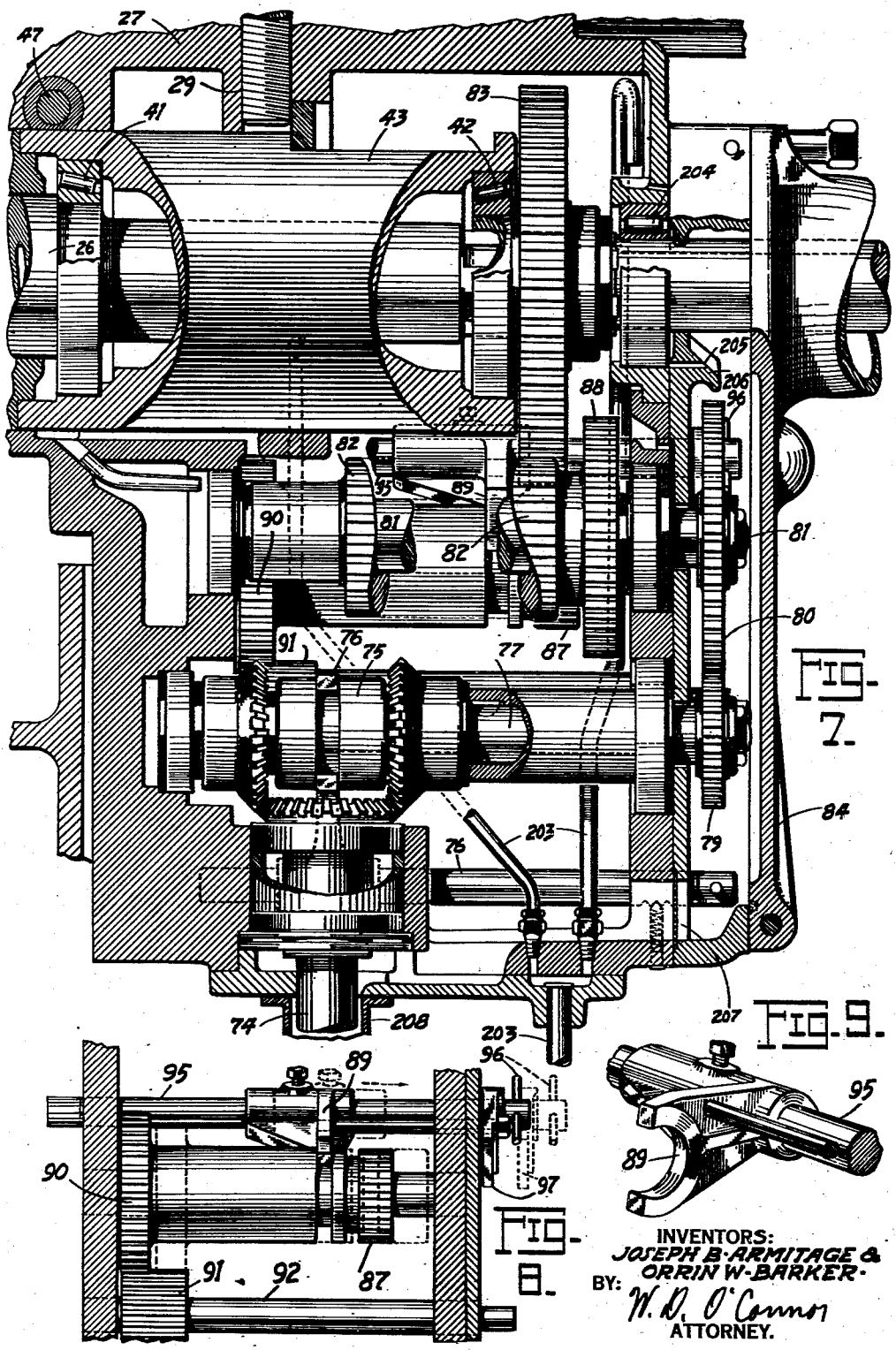

Sept. 17, 1946.  J. B. ARMITAGE ET AL  2,407,913
MACHINE TOOL TRANSMISSION AND CONTROL MECHANISM
Filed Feb. 23, 1942  9 Sheets-Sheet 7

INVENTORS:
JOSEPH B. ARMITAGE &
ORRIN W. BARKER.
BY W. D. O'Connor
ATTORNEY.

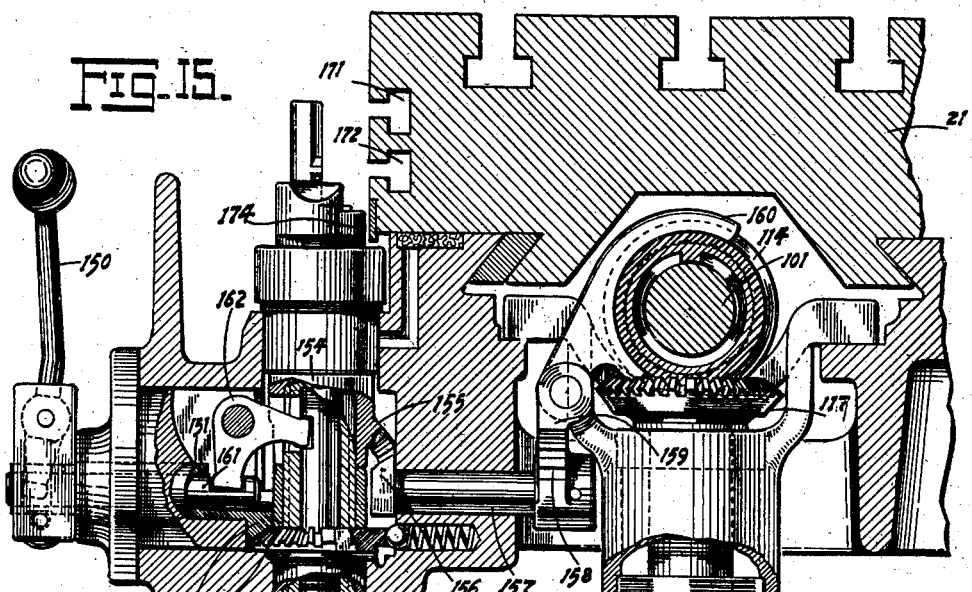
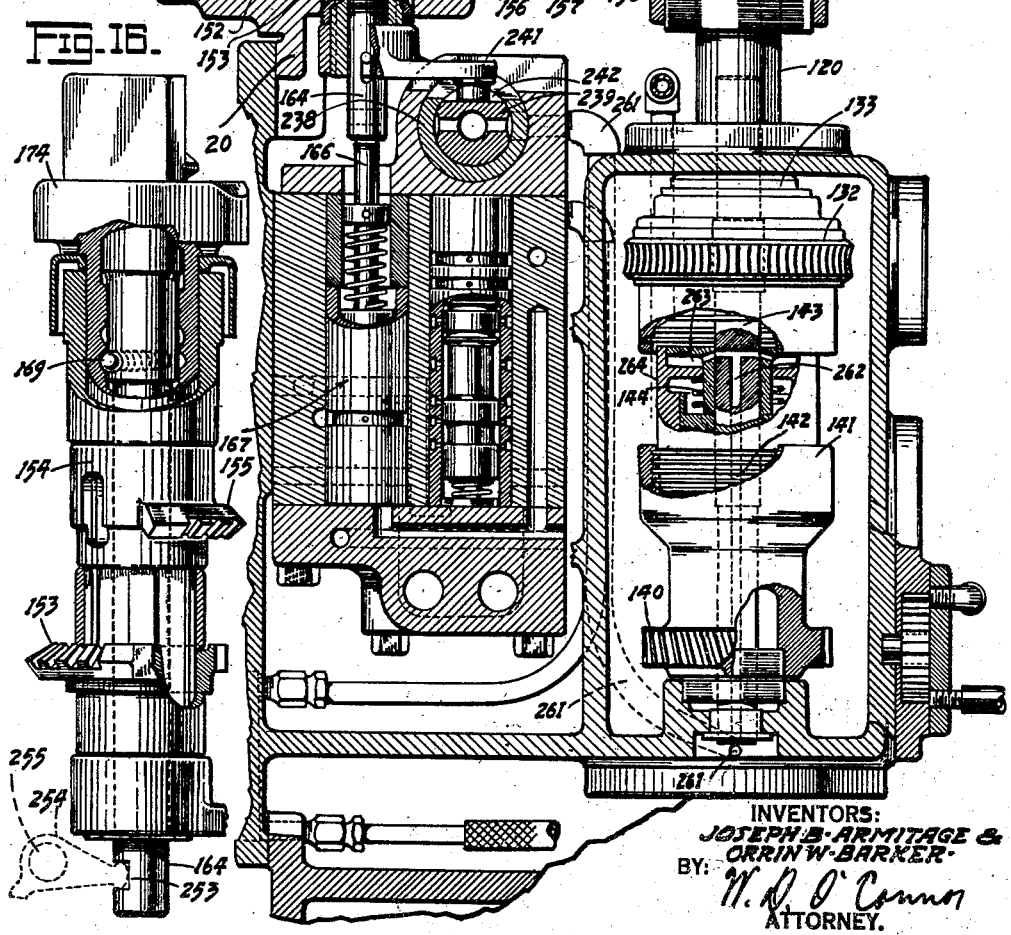

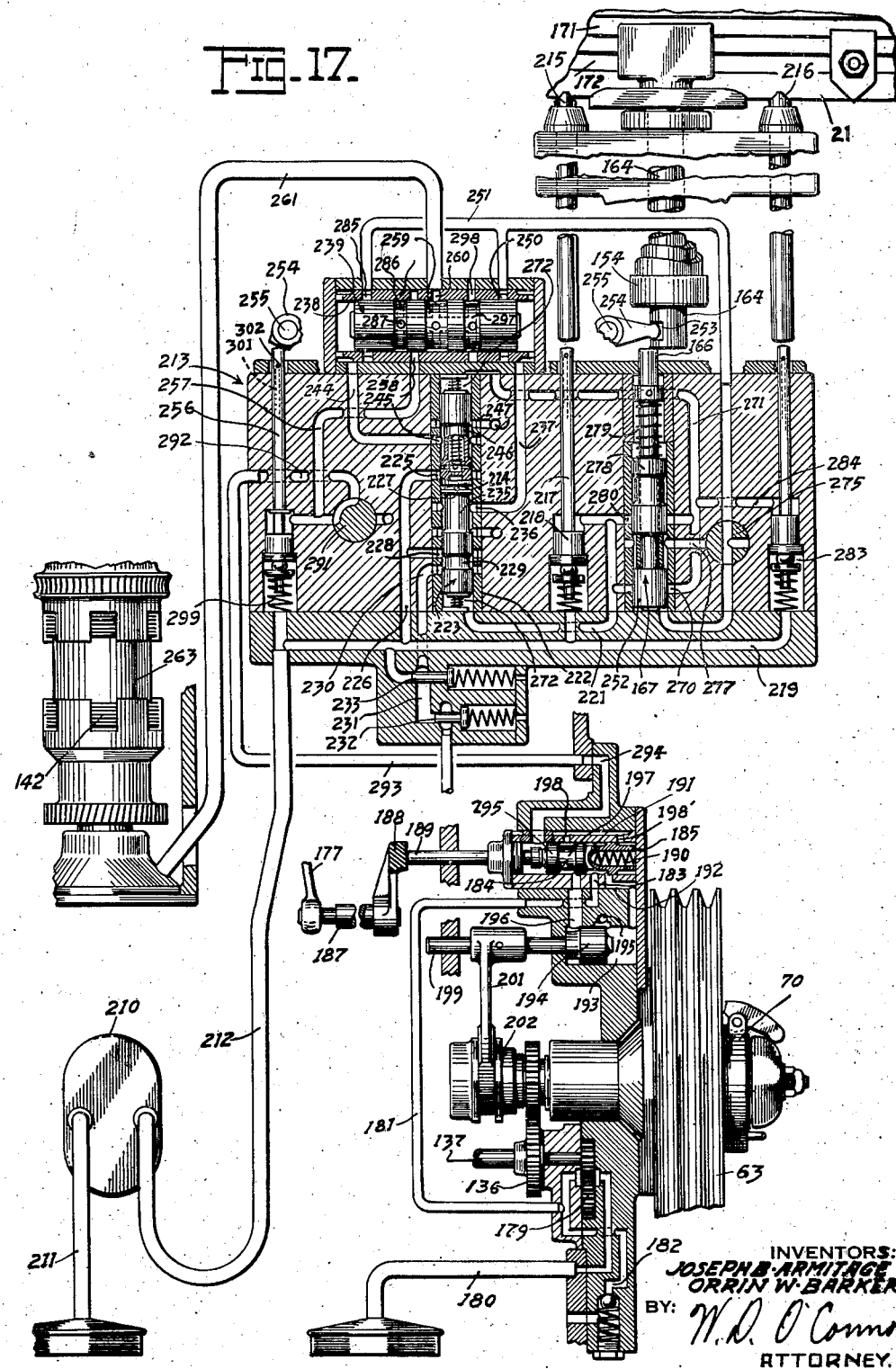

Patented Sept. 17, 1946

2,407,913

UNITED STATES PATENT OFFICE 2,407,913

MACHINE TOOL TRANSMISSION AND CONTROL MECHANISM

Joseph B. Armitage, Wauwatosa, and Orrin W. Barker, Milwaukee, Wis., assignors to Kearney & Trecker Corporation, West Allis, Wis., a corporation of Wisconsin Application February 23, 1942, Serial No. 431,908

20 Claims. (Cl. 90—21)

This invention relates, generally, to machine tools and more particularly to improved machine tool operating and controlling mechanism of the type especially adapted for utilization in milling machines.

A general object of the invention is to provide improved structural arrangements and actuating mechanism for a machine tool;

Another object is to provide an improved power transmitting mechanism for actuating the movable elements of a machine tool;

Another object is to provide an improved transmission mechanism and controlling apparatus arranged to be removable from a machine tool as a unit to facilitate inspection and maintenance thereof;

Another object is to provide an improved control mechanism for the operating elements of a machine tool;

Another object is to provide an improved hydraulically actuated control apparatus for a milling machine;

Another object is to provide an improved automatic reversing trip mechanism for a movable element of a machine tool;

Another object is to provide an improved clutch actuating control mechanism for a machine tool.

A further object is to provide an improved driving arrangement for a work supporting table of a machine tool.

According to this invention, a milling machine is provided with an improved spindle driving mechanism arranged to afford a series of spindle speeds in two ranges. Likewise, an improved rate changing feeding mechanism for the work supporting table is provided with pick-off change gears and an improved hydraulic automatic reversing mechanism, the hydraulic mechanism being mounted with the pick-off gearing to constitute a unitary structure that is readily removable from the machine for inspection. The hydraulic control system includes improved means for effecting automatic reversal into movement at either feed or rapid traverse rate, and actuates an improved selective main clutch controlling system that may be utilized for stopping the spindle automatically when the rapid traverse drive is engaged.

The invention is exemplified herein by an embodying machine tool structure, but it is to be understood that the particular apparatus set forth is intended to be illustrative only and that the various individual characteristics may be embodied in other structural forms, all coming within the range of equivalents of the features defined in the subjoined claims.

The foregoing and other objects of this invention, which will be more readily discerned from the following detailed description, may be achieved by means of the illustrative apparatus depicted in, and described herein in connection with, the accompanying drawings in which:

Figure 1 is a general view in front elevation of a milling machine exemplifying the type of machine tool in which the present invention may be incorporated to advantage;

Fig. 2 is a view in side elevation of the milling machine shown in Fig. 1, with parts broken away;

Fig. 3 is a detailed view in perspective of a clamping device for the overarm structure of the milling machine;

Fig. 4 is a partial view in perspective, showing the vertically movable spindle carrying head;

Fig. 5 is a view partly in plan and partly in horizontal section taken along the line 5—5 in Fig. 1.

Fig. 6 is an enlarged view in rear elevation of the milling machine with parts broken away to show internal mechanism;

Fig. 7 is an enlarged view largely in vertical axial section through the spindle carrying block, showing the spindle driving transmission mechanism;

Fig. 8 is a detailed view of the gear shifting mechanism in the spindle transmission;

Fig. 9 is a view in perspective of the gear shifting yoke;

Fig. 10 is a fragmentary sectional view of one end of the work supporting table showing the screw supporting bearing bracket, taken largely in vertical section along the line 10—10 in Fig. 2;

Fig. 11 is a fragmentary plan view of an improved table screw driving mechanism;

Fig. 12 is an expanded diagrammatic view of the spindle driving speed changing train;

Fig. 15 is an enlarged fragmentary view in vertical section taken along the line 15—15 of Fig. 1, showing the trip mechanism for controlling the movement of the work supporting table;

Fig. 16 is an enlarged view of the tripping post with parts broken away to show the internal construction; and, Fig. 17 is a schematic circuit diagram of the hydraulic control system for effecting automatic operation of the milling machine.

Figure 13:
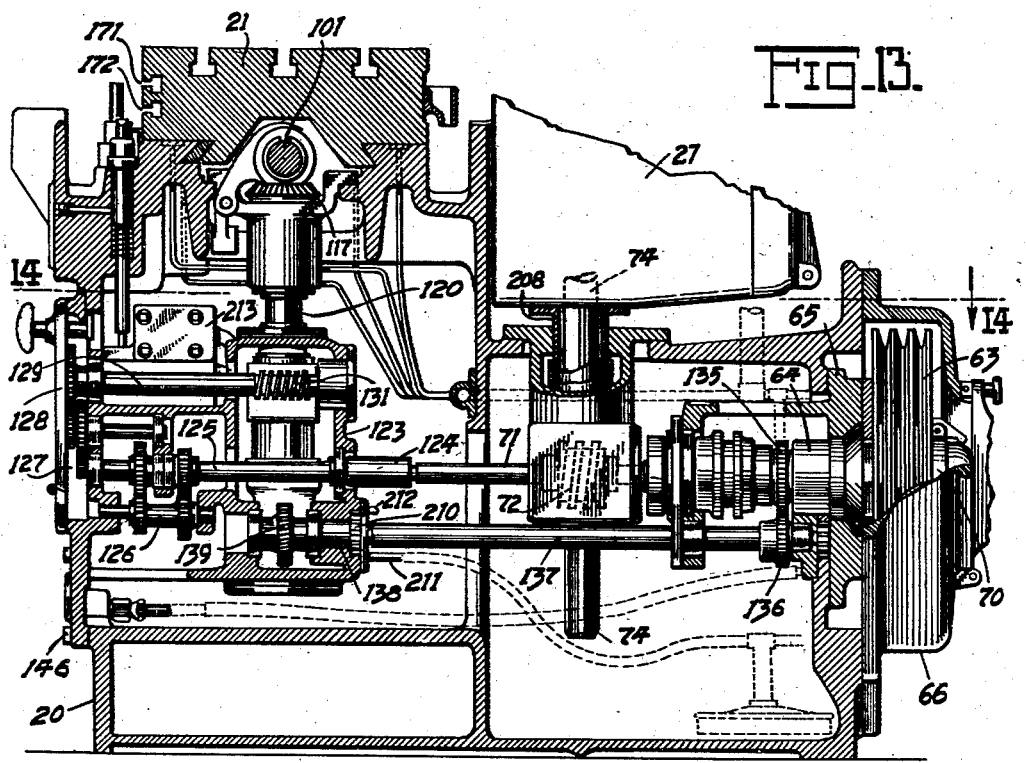
Fig. 13 is a fragmentary view in vertical section through the bed of the machine, taken along the line 13—13 in Fig. 1, showing the table driving power transmission train.

The particular machine tool illustrated in the drawings as exemplifying a practical embodiment of the principles of the present invention, is a milling machine of the bed type, similar in general form and arrangement of parts to the milling machine shown in United States Patent No. 2,118,357 issued May 24, 1938.

Referring more specifically to Fig. 1 of the drawings, the milling machine there shown comprises essentially a hollow bed or base 20 that constitutes the main supporting frame of the machine and forms a housing for the driving and controlling mechanism.

On the upper forward surface of the bed 20, a work supporting table 21 is slidably mounted for reciprocating movement longitudinally of the bed. At the rear of the table, a pair of uprights 22 and 23 are securely fixed to the upper surface of the bed 20 in spaced relationship and are joined at the top by a cap 24 to constitute a rigid upstanding column structure. As shown, in Fig. 2, the column structure serves to support a rotatably mounted tool spindle 26 in cooperating relationship with the work table 21.

To provide for adjusting the position of the spindle 26 relative to the work table 21, the spindle is carried by a spindle supporting head or block 27 which is slidably mounted between the uprights 22 and 23 for vertical movement. Adjustment of the vertical position of the spindle head is effected by turning a combined hand wheel and nut 28 which abuts against the top of the cap 24 and has threaded engagement with a screw 29 the lower end of which is fixed in the spindle block 27, a graduated dial 30 being provided on the nut for indicating the amount of movement.

As best shown in Fig. 5, the spindle head 27 is provided at its sides with projecting angularly disposed vertical guiding ways 32 and 33, respectively. The forward sloping surfaces of the angular ways have sliding engagement with complementary angularly disposed surfaces formed in the uprights 22 and 23. At its forward edge, the spindle block 27 is provided with laterally projecting lugs 34 and 35 which have sliding engagement with flat ways formed in a common plane on the forward faces of the uprights 22 and 23 respectively. The angular way 33 on the head is provided with an adjusting gib 37 which may be tightened to effect accurate sliding engagement between the head and the uprights. As may readily be seen, when the gib 37 is tightened it moves into engagement with the complementary way in the upright 23 and draws the lug 35 against the forward face of the upright. Simultaneously, the wedging action of the gib upon the angularly disposed sliding surface of the upright 23 forces the entire head 27 to the left and effects a similar wedging action between the sloping forward face of the way 32 and the plane face of the lug 34 upon the complementary surfaces of the upright 22, clearance spaces being provided between the other surfaces of the head and the uprights as indicated in the drawings. This arrangement provides for effecting close adjustment between the sliding head and the cooperating ways of the column structure to insure accurate movement of the head. After the spindle head has been adjusted to bring the spindle 26 to the desired vertical position, by turning the hand wheel 28, the head 27 may be locked to the uprights by tightening clamping bolts 38 which operate in T-slots 39 in the forward faces of the uprights and project through the lugs 34 and 35 of the head to clamp them against the forward flat ways.

To provide for horizontal adjustment of the position of a cutter carried by the spindle 26, the spindle is rotatably supported, by means of antifriction bearings 41 and 42, in the ends of a cylindrical quill structure 43 which is slidably mounted for axial movement in the head 27, as shown in Figs. 2 and 7. Axial adjustment of the position of the quill is effected by turning a hand wheel 44 at the side of the upright 23, the hand wheel being operatively connected to the quill in well known manner and provided with a graduated dial 45 to indicate the longitudinal position of the spindle. After the spindle quill has been moved to an adjusted position, it may be clamped to the spindle block by turning a clamping nut 46 which draws a clamping element 47 into engagement with the quill, as shown in Fig. 7.

Above the spindle 26, a pair of overarms 51 and 52 are slidably mounted in the spindle block 27 in manner to extend forward to support a cutter carrying arbor, as shown in Fig. 2, the arms being connected at their forward ends to the bed 20 by means of a harness structure 53. As best shown in Fig. 6, the upper part of the head 27 is provided with a kerf 54 extending horizontally between the arm receiving bores to provide a resilient portion that may be deflected for clamping the arms. For this purpose, a clamping screw 55 is provided between the arms at each end of the head 27, the screws being fixed in the head beneath the kerf 54 by means of pins 56. Clamping nuts 57 are threaded on the upper ends of the screws 55 in manner to bear upon the top of the head and are adapted when tightened to deflect the upper portion of the head 27 into clamping engagement with the overarms. To provide for tightening the two clamping nuts simultaneously, each nut is fitted with an arm 58 the arms being interconnected by a link 59 pivoted at its respective ends to the end of each arm. As shown, the forward nut 57 is provided with a wrench receiving hexagonal top by means of which both nuts may be tightened to clamp the overarms equally at both ends of the head. As best shown in Fig. 3, each nut 57 is provided with peripheral serrations which are engaged by complementary internal serrations in the cooperating arm 58. By reason of this serrated connection, each arm 58 may be adjusted angularly relative to its cooperating nut 57 in manner to equalize the clamping pressure exerted at the respective ends of the head 27. This arrangement provides for correcting any inequality which may result from wear between the nuts and the screws or the head, since the arms may be removed readily from the nuts at any time and re-engaged with the nut serrations at the position of adjustment providing for equal clamping pressures.

Power for moving the work table 21 and for rotating the cutter spindle 26 is derived from an electric motor 61 mounted in the hollow bed 20, as indicated in Fig. 6, and connected by multiple belts 62 to a main driving pulley 63. As best shown in Fig. 13, the driving pulley 63 is rotatably mounted at the rear of the bed by means of an inwardly extending hub 64 journalled in a pulley bracket 65 secured in an opening at the back of the bed, the pulley and belts being enclosed within a housing 66 provided with a hinged cover portion 67. For transmitting power to turn the tool spindle and to move the table at feed rate, the pulley 63 is selectively connected, by means of a clutch 70, to a main driving shaft 71 that extends through the bed to the front of the machine.

Figure 14:
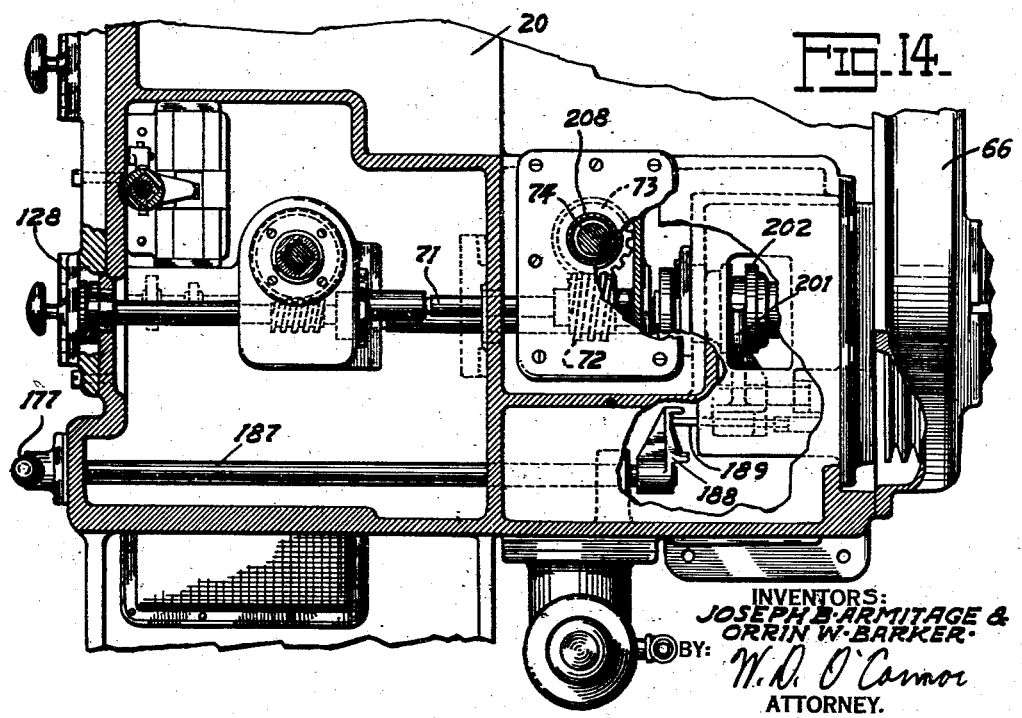
Fig. 14 is a fragmentary view taken in horizontal section along the line 14—14 in Fig. 13.

Power for rotating the spindle 26 is taken from the main shaft 71 by means of a worm 72, shown in Figs. 13 and 14, that is fixed on the shaft and has meshing engagement with a worm wheel 73 rotatably supported in the bed 20. The worm wheel 73 has splined connection with a vertically disposed splined shaft 74 that is journalled in the spindle head 27 and arranged for vertical movement therewith, the splined connection with the worm wheel 73 providing a driving connection regardless of the vertical position of the spindle head. The vertical shaft 74 delivers power at constant speed to a bevel gear reversing mechanism 75 in the spindle head 27, as shown in Fig. 7. For effecting reversal in the direction of spindle rotation, the reverser 75 may be actuated by a shifting arm 76 to provide for coupling the vertical shaft 74 to a horizontal power driven shaft 77 in manner to drive it in either direction for turning the spindle in either direction selectively.

From the horizontal power driven shaft 77 in the head 27, power is transmitted to drive the spindle at a selected rate in either of two speed ranges. When operating in the high speed range, power from the shaft 77 is transmitted by a pick-off gear 79 removably fitted on the end of the shaft, to a complementary pick-off gear 80 similarly fitted on the end of a parallel spindle driving shaft 81. The shaft 81 is provided within the spindle head 27 with a long pinion 82 that meshes with a large gear wheel 83 fixed on the spindle 26 in the rear of the quill 43, the arrangement being such that the gear wheel 83 may slide along the pinion 82 when the spindle and quill are adjusted axially within the head 27.

As may best be seen by reference to Figs. 6 and 7, the pick-off gears 79 and 80 are mounted on the rear face of the head 27 and are protected by means of a hinged cover plate or door 84 which may be opened to provide access to the gear receiving ends of the shafts. Alternative sets of pick-off gears arranged to provide a series of spindle speeds, are stored in covered recesses 85 at the rear of the bed, as shown in Fig. 6.

For driving the spindle in the low speed range, there is provided a speed reducing or range changing intermediate or back gear mechanism arranged to transmit power indirectly from the power driven shaft 77 to the spindle driving shaft 81. As may best be seen in the diagrammatic view, Fig. 12, the intermediate speed reducing mechanism includes a shiftable pinion 87 that may be moved into meshing engagement with a complementary gear 88 on the spindle driving shaft 81, a shifting fork 89 being provided for this purpose. The pinion 87 has associated with it a gear wheel 90 which meshes with a long pinion 91 fixed on an intermediate shaft 92, the arrangement being such that the gear 90 may slide along the pinion 91 when the pinion 87 is shifted into or out of meshing engagement with the gear 88. The intermediate shaft 92 is provided at its end 93 with means for receiving a pick-off gear adapted to mesh with a complementary pick-off gear on the driven shaft 77. The pair of pick-off gears transmitting power from the driven shaft 77 to the intermediate shaft 92 replace the pick-off gear direct driving connection between the shaft 77 and the spindle driving shaft 81 represented by the gears 79 and 80 shown in Figs. 6, 7 and 12 in the drawings.

Since the driving mechanism would be locked, and injury might possibly result to the machine if intermeshing pick-off gears should be applied to both the shaft 81 and the shaft 92 at the same time, means are provided for preventing the application of a pick-off gear to the shaft 81 when the intermediate pinion 87 is meshed with the gear 88 for driving the shaft 81. As shown in Fig. 8 of the drawings, the shifting fork 89 associated with the pinion 87 is provided with an actuating rod 95 that extends through the rear wall of the head 27 into the pick-off gear compartment and is provided at its end with an actuating handle 96 which is accessible when the hinged door 84 is open, the arrangement being such that the handle 96 may be drawn outward to engage the intermediate drive and moved inward to disengage the drive. To prevent application of a pick-off gear to the shaft 81 when the pinion 87 is engaged with the gear 88, the shifting rod 95 is provided with an interlocking or interfering member 97 so arranged that it moves outward into the space otherwise occupied by the pick-off gear on the shaft 81 when the handle 96 is pulled out to engage the pinion 87 with the gear 88, thus preventing a pick-off gear from being placed on the end of the shaft 81 while the intermediate speed reducing mechanism is engaged. Furthermore, this interlocking arrangement compels disengagement of the intermediate drive when it is desired to operate in the high speed range with a pick-off gear on the shaft 81. This is desirable even though no pick-off gear is applied to the shaft 92, since with the spindle driving shaft 81 operating in the fast range, the intermediate shaft 92 would be turned at excessive speed which would result in undue wear of the mechanism. In the event that a pick-off gear should be applied to the shaft 92 when operating in the high speed range, and meshed with either the pick-off gear 79 on the shaft 77 or the pick-off gear 80 on the shaft 81, no harm would be done since, with the pinion 87 shifted out of mesh, this would result merely in turning the intermediate mechanism idly at moderate speed.

The work supporting table 21 is driven to reciprocate in cooperating relationship with the tool spindle 26, by means of a feed screw 101 that is rotatably supported from the table in cooperating relationship with a stationary nut 102 fixed in the bed 20. As appears in Figs. 1, 2 and 10, the feed screw 101 is rotatably supported at its ends by anti-friction bearings carried in table brackets 103 and 104 depending from the respective ends of the table 21. As best shown in Fig. 2, the table brackets are fitted into semi-cylindrical sockets 105 in the lower surface of the table ends between ways 106 which slide on complementary surfaces formed in the bed 20, the arrangement being such that the ways extend to the ends of the table and serve to cover and protect the complementary surfaces in the bed at all times. As shown in Fig. 1, the table brackets are secured to the lower side of the table by means of cap screws 107.

As best shown in Fig. 11, the stationary nut 102 is mounted in a plate or bracket 110 that is secured by cap screws 111 to the top of the bed 20 between the table receiving bearing surfaces. The bracket 110 also carries a bevel gear reversing mechanism 112 arranged to drive the table screw in either direction selectively. As shown, the reversing mechanism includes a sleeve 113 having splined connection with the screw 101 for rotating it and provided on its periphery with serrations. The serrations on the sleeve 113 are engaged by internal serrations in a complementary shifting collar 114 provided at its ends with clutch teeth that may be shifted into engagement with either of two bevel clutch gears 115 and 116 rotatably mounted in axially spaced bearing elements secured to the bracket 110. The clutch gears 115 and 116 are arranged to be driven continuously in opposite directions by means of an intermeshing bevel gear 117 journalled in the bracket 110 and having splined connection with the splined upper end of a vertically disposed table driving shaft 120. As may be seen by reference to Figs. 11 and 15, the table driving screw 101 and its associated feed nut and reverse gear driving mechanism on the bracket 110, may all be removed from the bed of the machine as a unit. A protecting cover 121, shown in Fig. 11, is secured by screws to the upper surface of the bracket 110 to protect the table driving mechanism from dust or other foreign matter.

In order to remove the table screw and its driving mechanism with the bracket 110, the table brackets 103 and 104 are first detached from the ends of the table by withdrawing the securing cap screws 107. The table may then be removed from the bed by sliding it endwise along the bearing surfaces, leaving the screw in its original position. After the table has been removed, the protecting cover 121 may be detached to expose the cap screws 111. The cap screws 111 are then withdrawn and the bracket 110 lifted to disengage the bevel gear 117 from the splined upper end of the shaft 120, whereupon the bracket 110 together with the table screw, end brackets, feed nut and reverse gearing may be removed from the machine as a unit.

The vertical table driving shaft 120 is arranged to be driven in predetermined direction continuously at either a selected feed rate or rapid traverse rate, the driving power being applied to the screw 101 in one or the other direction selectively in accordance with the position of the shifting collar 114. As appears in Figs. 13, 14 and 15, the vertical table driving shaft 120 is journalled in a bracket 123 which also carries the table feed rate changing and controlling mechanism and is mounted in an opening at the front of the bed 20 for removal therefrom as a unit.

Power for actuating the table at feed rate is derived from the main shaft 71 to which it is transmitted from the motor 61 through the spindle controlling clutch 70. As shown in Fig. 13, the shaft 71 is connected by means of a splined coupling 124 to a shaft 125 that is journalled in the bracket 123. From the shaft 125, power is transmitted through reduction gearing 126 of fixed ratio to a pick-off gear mechanism 127 arranged at the front of the bracket 123 and made accessible by opening a hinged door 128. By fitting gears of the proper ratio in the pick-off mechanism, the power may be transmitted at any desired feed rate to a worm shaft 129, spare gears for the pick-off mechanism being retained in a storage compartment closed by another hinged door 130 at the front of the machine, as shown in Fig. 1. The feed rate worm shaft 129 is provided with a worm 131 which meshes with a worm wheel 132 mounted concentric with the vertical table driving shaft 120, as shown in Fig. 15. A driving connection between the worm wheel 132 and the vertical shaft 120 is effected by means of an overrunning clutch mechanism 133 arranged to permit the shaft 120 to be operated in the same direction at rapid traverse rate without interference from the feed driving mechanism.

Power for driving the table 21 at rapid traverse rate is derived directly from the driving pulley 63 independently of the clutch 70, by means of a gear 135 fixed on the hub 64 of the pulley and meshing with a gear 136 on a rapid traverse shaft 137 extending forward to the table feed bracket 123, the arrangement being such that the table may be actuated at rapid traverse rate regardless of whether or not the main clutch 70 is engaged to drive the spindle 26. As shown, the shaft 137 is splined at its forward end to a hollow shaft 138 journalled in the bracket 123 and carrying a spiral gear 139 which meshes with a complementary spiral gear 140 fixed on a clutch housing 141 mounted concentrically with the vertically disposed table driving shaft 120. The rapid traverse driving mechanism may be connected selectively to actuate the table 21 by engaging a hydraulically actuated friction clutch 142 mounted in the housing 141. In changing from rapid traverse rate back to the predetermined feed rate of movement, the rapid traverse clutch 142 is disengaged by releasing hydraulic pressure thereon and a synchronizing friction clutch 143 is forced into engagement by a spring 144 to quickly reduce the driving speed to that of the overrunning clutch 133 in the manner set forth and claimed in United States Patent No. 2,215,684.

By thus arranging the feed and rapid traverse rate selecting clutch mechanism on the vertical table driving shaft 120, a direct and positive connection is afforded from this mechanism to the table actuating screw 101. Furthermore, this arrangement facilitates disconnecting the driving mechanism for removing the feed bracket 123 from the machine.

As may be seen by reference to Fig. 13, the feed bracket 123 may be removed from the machine bed as a unit by first detaching the pulley bracket 65 from the bed and withdrawing it a sufficient distance to disengage the splined ends of the shafts 71 and 137 from the splined coupling 124 and the splined hollow shaft 138 respectively. The bracket 123 may then be detached from the front of the machine bed by withdrawing the cap screws 146 that retain it, whereupon the bracket may be lowered within the bed to disengage the splined vertical shaft 120 from the table driving bevel gear 117. This frees the bracket from all mechanical connection with the machine structure and upon disconnecting an oil suction pipe the bracket and its associated apparatus may be withdrawn forwardly out of the bed 20 to provide access to the entire table driving and control mechanism for inspection and repair.

The rate and direction of power movement of the table 21 may be controlled manually by actuating a lever 150 pivotally mounted on the front of the machine as shown in Figs. 1, 2 and 15. The direction of movement of the table 21 is controlled by swinging the lever 150 to the right or left, as indicated by the arrows in Fig. 1, the arrangement being such that the table is thereby caused to move in the corresponding direction. As shown in Fig. 15, the lever 150 is carried by a pivotally mounted sleeve 151 provided at its inner end with a bevel gear segment 152 which meshes with a complementary bevel gear segment 153 fixed on a vertically disposed tripping sleeve 154. The sleeve 154 is provided at its other side with a reversed bevel gear segment 155 which meshes in turn with a complementary segment 156 fixed on the end of a reversing shaft 157. The reversing shaft 157 is provided at its inner end with a spur gear segment 158 which meshes with a rack 159 on a slidably mounted shifting fork 160 which engages a central groove in the reversing collar 114. The arrangement is such that when the lever 150 is in the central or neutral position shown in Fig. 1, the collar 114 is in the disengaged position shown in Fig. 11. Movement of the lever to the left causes the collar 114 to move to the left into engagement with the clutch gear 115, which results in driving the table to the left. Conversely, when the lever is moved to the right the collar engages the clutch gear 116 and drives the table to the right.

Control of the rate at which the table moves is effected by tilting the lever 150 toward or from the machine. As shown in Fig. 15, the lever 150 is pivotally connected to the sleeve 151 in a manner to permit tilting movement and is arranged to engage with its lower end a sliding control rod 161. The control rod 161 moves in and out in accordance with movement of the lever 150 and turns a bell crank 162 which engages and effects vertical movement of a tripping post 164. The lower end of the tripping post 164 abuts against a plunger 166 of a rate selector 167 and engages a rapid traverse valve actuator, the arrangement being such that when the lever 150 is moved forward or away from the machine, the tripping post 164 moves upward, causing the rapid traverse valve to admit pressure to the rapid traverse clutch mechanism 142 thereby engaging the clutch and causing the table to move at rapid traverse rate.

As shown in the enlarged view, Fig. 16, the tripping post 164 is mounted within the tripping sleeve 154 and is provided with a detent mechanism 169 arranged to retain it in either its upper or lower position. Automatic change in the rate of movement of the table while the machine is in operation, is effected by means of suitable rapid traverse trip dogs mounted in T slots 171 and 172 in the forward edge of the table 21, the arrangement being such that the dogs move the tripping post 164 up or down as they pass, to change the rate of table movement from feed to rapid traverse or vice versa. Other tripping dogs may be provided to stop movement of the table at any predetermined position, these stop dogs being arranged to contact wings 174 on the tripping sleeve 154 and functioning to turn it to its central or neutral position, thereby disengaging the reversing collar 114 from its complementary clutch gear.

The main driving clutch 70 for controlling the spindle and the feed rate table driving mechanism is arranged to be actuated hydraulically to connecting position or to disconnecting position in response to movement of a manually actuated clutch controlling lever 177 mounted at the right front of the machine as shown in Figs. 1 and 2, the clutch being arranged for automatic hydraulic operation also, in order to provide for stopping the spindle automatically when the table is moved at rapid traverse rate. Referring now to the hydraulic circuit shown in Fig. 17, pressure for actuating the main disconnecting clutch 70 is derived from a gear pump 179 that is connected to the end of the rapid traverse shaft 137 in manner to be driven thereby whenever the pulley 63 is operating. The pump 179 draws hydraulic fluid from a sump in the bottom of the machine bed through a conduit 180 and forces it under pressure into a conduit 181, the pressure being limited by a release valve 182 arranged to release pressure above a predetermined maximum. The pressure conduit 181 leads to a central pressure port 183 in a pilot valve 184 provided with a spring urged valve plunger 185.

When the clutch lever 177 is swung to the left it turns a control shaft 187 shown in Fig. 14, which is provided at its inner end with a cam element 188 that cooperates with one end of a sliding plunger 189, the cam acting mechanically to move the plunger to the right, as shown in Fig. 17, in such manner that its other end engages the valve plunger 185 and forces it positively to the right against the action biasing of a spring 190 which normally urges the plunger 185 toward its left position. With the valve plunger 185 in the right position as shown, a cannelure 191 in the valve plunger 185 establishes communication from the pressure port 183 to a port 192 which leads to the right end of a clutch actuating cylinder 193. Pressure in the right end of the clutch actuating cylinder 193 forces a clutch actuating piston 194 to the left end of the cylinder, thereby uncovering a port 195 at the middle of the cylinder through which the pressure fluid escapes to the lubricating system of the machine. Fluid in the left end of the cylinder 193 is meanwhile exhausted through a port 196 which is then in communication through another cannelure 197 of the valve plunger 185, with an exhaust port 198. When the clutch actuating piston 194 moves to the left, a piston rod 199 projecting from it moves a shifting fork 201 to the left likewise. The fork 201 engages a shifting collar 202 which is connected to actuate the clutch 70, the arrangement being such that when the collar is moved to the left the clutch is moved to disengaged position.

Upon moving the clutch controlling lever 177 to the right to its other position, the cam 188 is turned to a position, shown in Fig. 14, in which it releases the mechanical linkage plunger 189 and permits the pilot valve plunger 185 to move to the left under the influence of its biasing spring 190. With the plunger 185 in the left position, the pressure port 183 is placed in communication through the cannelure 191 with the port 196 leading to the left end of the clutch cylinder 193. Pressure admitted to the left end of the cylinder forces the piston 194 to the right which in turn moves the shifting collar 202 to the right to engage the clutch 70. Fluid in the right end of the cylinder 193 escapes through the port 192 and past the right end of the plunger 185 into an exhaust port 198. With the actuating piston 194 at the right end of the cylinder 193, the lubrication port 195 is again uncovered to permit the flow of the pressure fluid into the lubricating system.

As appears in Fig. 7, the lubricating fluid from the port 195 is forced upward into the spindle head 27 through suitable connecting conduits 203 one of which discharges above an anti-friction bearing 204 mounted in the rear wall of the head and serving to support the rearward portion of the spindle 26. The spindle is arranged to slide within the inner race of the bearing 204 when the quill 43 is moved longitudinally, the bearing race being slidably keyed to the spindle to prevent relative rotation therebetween. From the bearing 204 the lubricant drains through a passageway 205 on to a lip 206 from which it flows on to the pick-off gears 80 and 79 to lubricate them. Lubricant draining from the pick-off gears flows through a screened opening 207 into the lower part of the head 27 where it mingles with other excess lubricant draining from within the head. The lubricant collecting in the bottom of the head returns to the sump at the bottom of the machine bed through a telescoping tube 208 that constitutes a guard for the vertically disposed spindle driving shaft 74.

As previously explained, the automatic control system for regulating the rate and direction of movement of the table 21 is mounted on the table feed bracket 123 in manner to be removable from the machine with the feed and rapid traverse driving mechanism as a unit. Hydraulic pressure for actuating the table control system is derived from an independent pump 210 that is mounted in the bracket 123 and arranged to be driven continuously by the rapid traverse shaft 137, as shown in Fig. 13. The pump 210 withdraws fluid from the sump through a conduit 211 and forces it under pressure through a conduit 212 to a valve block 213 of the control system that is carried by the bracket 123.

In order that the table 21 may be operated automatically in accordance with various cycles, means are provided in the control system for effecting automatic reversal of table movement to movement in the opposite direction either at feed rate or at rapid traverse rate. For this purpose, automatic reversing plungers 215 and 216 are provided at the respective sides of the rapid traverse trip post 164 in position to be engaged by reversing trip dogs on the table. For example, if the table is moving from left to right and a reversing trip dog engages the reversing plunger 215, it is moved downward into engagement with a poppet valve plunger 217 thereby opening a reverse poppet valve 218 and admitting pressure fluid into a pressure conduit 219 in the valve block 213, which is connected to the conduit 212 delivering pressure from the pump 210. The pressure fluid flowing through the open poppet valve 218 follows a conduit 221 into an actuating cylinder formed in the lower end of a reversing valve 222 and there exerts pressure upon a valve plunger 223 forcing it upward. When the plunger 223 moves upward, a narrow groove 224 therein moves into register with a pressure port 225, which is connected by a conduit 226 with the pressure conduit 219, thereby admitting pressure fluid through the groove 224 into a longitudinal pasageway 227 in the valve plunger 223 that extends to the lower end of the valve 222. Pressure fluid admitted through the passageway 227 exerts additional pressure on the lower end of the valve plunger 223 tending to move it upward. This pressure is continued upon the plunger 223 even though the reversing poppet valve 218 may close because of withdrawal of the reversing trip dog from the plunger 215, the port 225 being wide enough to maintain the connection with the passageway 227 until the valve plunger 223 reaches its upper extreme position.

When the reversing valve plunger 223 is in the neutral position shown in Fig. 17, pressure fluid from the conduit 226 flows through a port 228 which is then in communication, through a groove 229 in the plunger 223, with a port 230 from which a conduit 231 leads to a low pressure relief valve 232 that permits the escape of excessive pressure fluid. As the plunger 223 moves upward in response to a reversing action, the groove 229 moves out of register with the port 230 thus interrupting communication with the low pressure relief valve 232. This causes the pressure in the system to increase to a predetermined high pressure suitable for actuating the reversing mechanism, the pressure then being limited by a high pressure relief valve 233 connected directly to the pressure conduit 219.

When the reversing valve plunger 223 arrives at its upper position, the pressure port 225 is placed in communication, through a groove 235 on the valve plunger, with a port 236 from which the pressure fluid flows through a conduit 237 to the right end of a reversing motor cylinder 238. Pressure in the right end of the cylinder 238 forces a cooperating reversing piston 239 to the left, the piston in turn exerting force upon an arm 241 which engages a slot 242 in the piston 239, as shown in Fig. 15. The arm 241 is fixed on the tripping sleeve 154 and the arrangement is such that when the piston 239 is moved to either extreme position, the tripping sleeve is turned to a position in which the shifting clutch collar 114 is engaged with one or the other of the reversing clutch gears 115 or 116 as previously explained, thereby providing for movement of the table 21 in the reverse direction. As the piston 239 moves to the left, fluid in the left end of the cylinder 238, is forced out through a conduit 244 leading to a port 245 that is then in communication through a groove 246 in the valve 223 with an exhaust port 247.

When the piston 239 arrives at its extreme left position, it uncovers a port 250 through which pressure fluid flows into a conduit 251 leading to a cylinder formed in the lower end of the rate selector 167. The pressure in the lower end of the selector 167 is exerted upon a piston 252 formed on the lower end of the valve plunger 166, forcing the plunger and the rapid traverse tripping post 164 upward to the rapid traverse position. As appears in Figs. 15, 16 and 17, the tripping post 164 is provided with a groove 253 at its lower end that engages one end of a rocker arm 254 which is pivotally mounted on a pin 255. The rocker arm 254 is provided with a cam element which bears upon the stem of a rapid traverse poppet valve 256 shown at the left in the schematic diagram, Fig. 17, the arrangement being such that when the trip post 164 moves upward to rapid traverse position, the poppet valve 256 is depressed and opened. This results in admitting pressure fluid from the pressure conduit 219 through the poppet valve 256 into a conduit 257 that leads to a port 258 in the reversing cylinder 238.

With the reversing piston 239 in the left position, the port 258 is placed in communication through a groove 259 in the piston 239, with a rapid traverse port 260. From the port 260, a conduit 261 leads to the lower end of the vertically arranged table driving shaft 120 which carries the hydraulically actuated rapid traverse clutch 142. As appears in Fig. 15, pressure fluid from the conduit 261 flows through a passageway 262 formed longitudinally of the shaft 120 and thence into a cylinder 263 where it exerts pressure upon a piston 264 that operates to exert force upon and engage the rapid traverse friction clutch 142.

When the rate selector plunger 166 moves upward under the influence of pressure exerted through the reversing valve and the reversing cylinder, its lower end uncovers a port 270 which establishes communication from the conduit 221 leading to the lower end of the reversing valve 222 and a conduit 271 leading to the upper end of the reversing valve. This results in equalizing the pressures on the ends of the reversing valve plunger 223 and permits it to return to its central neutral position under the influence of centralizing springs 272 at its ends. As soon as the reversing valve plunger 223 returns to neutral position, communication is re-established between the pressure port 228 and the port 230, thereby permitting the pressure fluid to escape through the low pressure relief valve 232, the pressure in the system thereupon returning to the normal low pressure, following the reversing operation.

In the event that it is desired to effect movement in the reverse direction at feed rate instead of simultaneously changing to rapid traverse rate, a rate controlling valve 275 may be turned, by means of a control lever 276 mounted on the front of the machine as shown in Fig. 1, to close the conduit 251 leading from the reversing cylinder 238 to the lower end of the rate selector 167. With the valve 275 turned to feed position, communication is established from the conduit 251 through a port 277 which admits pressure fluid into the selector 167 above the piston 252 and below a sliding neutralizing sleeve 278. The pressure fluid acting on the sleeve 278 moves it upward in opposition to a spring 279 and in so doing uncovers a port 280 which establishes an alternative neutralizing connection between the lower conduit 221 and the upper conduit 271 leading to the respective ends of the reversing valve 222, thereby permitting the valve to return to neutral position.

Reversal in the direction of table movement is accomplished in similar manner when a reversing trip dog on the table, in moving from right to left, engages and depresses the other reversing plunger 216. This results in opening a reversing poppet valve 283 that admits pressure from the pressure conduit 219 into a conduit 284 leading to the conduit 271 which connects with an actuating cylinder at the upper end of the reversing valve 222. This causes the valve plunger 223 to move downward, again cutting off communication with the low pressure relief valve 232 and establishing communication from the pressure port 225 through the groove 246, the port 245 and the conduit 244 with the left end of the reversing cylinder 238. This moves the reversing piston 239 to the right, thereby shifting the reversing clutch collar 114 to its opposite position and simultaneously uncovering a port 285 communicating with the rapid traverse valve actuating conduit 251. When the pressure in the conduit 251, acting upon the lower end of the rate selector plunger 166, moves the rapid traverse post 164 upward and causes the rapid traverse poppet valve 256 to be opened, as previously explained, the pressure fluid flowing through the conduit 257 and the port 258, enters a groove 286 in the reverse piston 239 which is connected by a longitudinal passageway 287 with the groove 259 that communicates with the port 260 and the conduit 261 leading to the rapid traverse clutch.

If it is desired to cause the spindle 26 to stop rotating when the table 21 is moving at rapid traverse rate, in order to avoid marring the work, a spindle stop lever 290 on the front of the machine (Fig. 1) is turned to move a spindle stop valve 291 to the position shown in Fig. 17. With the valve in this position, pressure fluid admitted through the rapid traverse poppet valve 256 flows through the valve 291 into a conduit 292 in the valve block 213 which connects with a single lead or pipe 293 extending to the main clutch controlling mechanism at the rear of the machine. As shown, the pipe 293 connects with a conduit 294 leading to the left end of the pilot valve 184 thereby exerting pressure upon a piston 295 formed on the valve plunger 185 and forcing the plunger to the right, against the force of the spring 190, to the position shown. As previously explained, with the valve plunger 185 in this position, pressure fluid is admitted from the pump 179 to the clutch actuating cylinder 193 in manner to move the main clutch 70 to disengaged position, thereby stopping the spindle 26, the table 21 continuing to move at rapid traverse rate meanwhile by reason of the direct driving connection from the pulley 63 to the rapid traverse shaft 137.

The arrangement for controlling the main clutch by fluid pressure admitted through a single hydraulic lead to a pilot valve is broadly claimed in the previously mentioned United States Patent No. 2,215,684. However, in this instance the clutch is caused to be disengaged upon the exertion of pressure through the single control conduit, whereas in the patent, the control pressure is applied to effect engagement of the clutch. The advantage of the present arrangement lies in the fact that the clutch remains engaged regardless of momentary reduction in pressure in the hydraulic system, such as may result from utilizing the pressure fluid for other shifting operations. Positive operation of the pilot valve to disengage the clutch is assured by the direct mechanical connection from the clutch controlling lever 177 to the pilot valve plunger.

Whenever movement of the table 21 is stopped by disengaging the reversing clutch collar 114 from the reversing clutch gears, either through the operation of the automatic stop dogs upon the tripping sleeve 154 or through manual movement of the control lever 150 to neutral position, the reversing piston 239 is likewise moved to central neutral position. As shown in Fig. 17, when the piston 239 is in central position, both the groove 259 and the groove 286 are moved out of communication with the rapid traverse pressure port 258. At the same time a third groove 297, which communicates with the longitudinal passageway 287, is moved into register with an exhaust port 298 through which pressure fluid may escape from the rapid traverse clutch actuating cylinder 263 by way of the conduit 261 and the port 260. This permits the spring 144 of the rapid traverse clutch mechanism to disengage the rapid traverse clutch 142 and to engage the synchronizing clutch 143 for quickly reducing the speed of the table driving mechanism to the predetermined feed rate, as set forth and claimed in the previously mentioned United States Patent No. 2,215,684.

With the reversing piston 239 in either the forward or the reverse position, the rapid traverse drive may be engaged independently of the automatic reversing control by opening the rapid traverse poppet valve 256, either through movement of the rapid traverse trip post 164 by engagement with a rapid traverse trip dog to move it upwardly, or by moving the manually actuated control lever 150 outwardly from the machine, as previously explained. Furthermore, when the rapid traverse drive is disengaged by movement of the trip post 164 downward to feed position, the pressure is simultaneously relieved from the clutch controlling conduit 293 to permit the main clutch to re-engage, unless the pilot valve is restrained from movement to clutch engaging position by reason of the clutch lever actuated cam 188 being in clutch disengaging position. When the rapid traverse trip post 164 is moved down to feed position, the rapid traverse poppet valve 256 is permitted to move to closed position under the influence of a spring 299. By reason of a differential area on the actuating rod of the poppet valve, the rod is caused to move upward away from the valve ball thereby exposing the lower end of a longitudinal opening 301 through the rod, through which the pressure fluid may escape by way of a bleeder port 302.

At the conclusion of a hydraulic rate or direction changing operation, the excess pressure fluid escaping through the low pressure relief valve 232 flows into a lubricating system for the mechanism carried by the table driving bracket 123.

When it is desired to test the hydraulic control system, the table driving bracket 123 together with the entire control valve mechanism may be removed from the machine as previously described. A temporary power driving connection may then be applied to the pump 210 in manner to drive it for supplying hydraulic pressure to the control system during testing and experimental operation thereof. After the control system has been adjusted and tested apart from the machine the entire unit may be replaced in the machine bed with assurance that it will function correctly when the machine is put in operation.

From the foregoing detailed explanation of the operation of the exemplifying milling machine herein set forth as a practical embodiment of the present invention, it will appear that there has been provided an improved machine tool structure and actuating transmission and control mechanism that is especially adapted for convenient operation and that may be adjusted and maintained with facility.

Although the illustrative embodiment of the invention has been described in considerable detail for the purpose of fully disclosing a practical operative structure by means of which the invention may be practiced, it is to be understood that the particular apparatus and control system herein described are intended to be illustrative only and that the various novel characteristics of the invention may be incorporated in other structural forms without departing from the spirit and scope of the invention as defined in the subjoined claims.

The principles of the invention having now been fully explained in the foregoing written description of an illustrative embodying machine, we hereby claim as our invention:

1. In a machine tool, a driving mechanism including a disconnecting clutch, a fluid pressure system arranged to move said clutch alternatively to connecting position or to disconnecting position, a valve operatively connected to control said fluid pressure system, means biasing said control valve to a position effecting movement of said clutch to connecting position, fluid pressure means selectively operable to force said valve to a position effecting disconnecting movement of said clutch, control means acting upon said fluid pressure means for controlling said valve to thereby effect control of said disconnecting clutch, and other control means acting mechanically upon said valve to move it to a position effecting disconnecting movement of said clutch.

2. In a machine tool, a driving mechanism including a disconnecting clutch, a fluid pressure system arranged to move said clutch alternatively to connecting position or to disconnecting position, a valve operatively connected to control said fluid pressure system, means biasing said control valve to a position effecting movement of said clutch to connecting position, fluid pressure means selectively operable to force said valve to a position effecting disconnecting movement of said clutch, and manually operable control means selectively actuatable to move said valve mechanically to a position effecting disconnecting movement of said clutch.

3. In a milling machine having a driven member, means to drive said member including a hydraulically actuated disconnecting clutch, a source of pressure fluid for actuating said clutch, a pilot valve connected to control the flow of fluid from said source to said clutch to actuate it, means to urge said pilot valve to the position in which it effects engagement of said clutch, pressure fluid actuated means operative to move said pilot valve to the position in which it effects disengagement of said clutch, means to control the flow of actuating pressure fluid to said pilot valve, and a single fluid conduit operatively connecting said flow control means to said pilot valve, whereby said pilot valve may be moved from clutch engaging position to clutch disengaging position by impressing pressure upon it through said single fluid conduit.

4. In a machine tool, a frame, a working member movable in opposite directions selectively relative to said frame, power transmission mechanism including reversing means operative to effect movement of said member in said opposite directions selectively, a hydraulic motor operatively connected to adjust said reversing means, a reversing valve connected to admit pressure fluid to said motor, hydraulic pressure means operatively connected to shift said reversing valve, and trip mechanism operative in response to movement of said working member and functioning to control said reversing valve shifting hydraulic means, whereby automatic reversal in the direction of movement of said working member may be effected.

5. In a machine tool, a base, a movable machine element slidably mounted on said base, power actuated means operatively connected to reciprocate said machine element, trip mechanism mounted in said base in position to be actuated by said movable element in the course of its reciprocation to control its actuation, and a control unit removably mounted in said base in position to be actuated by said trip mechanism, said control unit comprising a hydraulically operated rate and direction changing mechanism and a pressure pump, said pump being releasably connected to said power actuated means, whereby said control unit may be removed in its entirety from said machine for testing under pressure developed by driving its pump independently of said machine.

6. In a milling machine, a base, table receiving ways formed on the surface of said base, a plate removably secured to said base between said table ways, a nut secured to said plate, a table driving screw threaded in said nut, table screw driving means including reversing and disconnecting mechanism rotatably mounted in said plate concentric with and operatively connected to said screw, the arrangement being such that said screw and its associated nut and driving mechanism on said plate may be removed from or applied to said bed as a unit, a work table slidably mounted on said table ways for longitudinal feeding movement, and bearing means attached to the ends of said table and rotatably receiving the ends of said screw in manner to transmit feeding movement of said screw to said table.

7. In a milling machine, a supporting structure, a movable working element carried by said supporting structure, a power transmission mechanism connected to drive said movable working element and including a hydraulically actuated disconnecting clutch, a source of hydraulic pressure for actuating said clutch, a control valve connected to control the flow of pressure liquid for engaging or disengaging said clutch selectively, means to bias said valve toward the position resulting in engagement of said clutch, and mechanical control linkage operatively arranged to force said valve positively to clutch disengaging position in opposition to said biasing force.

8. In a milling machine, a supporting structure, a movable working element carried by said supporting structure, a power transmission mechanism connected to drive said movable working element and including a hydraulically actuated disconnecting clutch, a source of hydraulic pressure for actuating said clutch, a control valve connected to control the flow of pressure liquid for engaging or disengaging said clutch selectively, means to bias said valve toward the position resulting in engagement of said clutch, control means arranged to apply hydraulic pressure to said valve in opposition to said biasing force for moving said valve to clutch disengaging position, and mechanical control linkage arranged to apply force to said valve in opposition to said biasing force for moving said valve positively to clutch disengaging position.

9. In a machine tool, a movable working element, means for transmitting power to said working element including a disconnecting clutch, hydraulic actuating mechanism arranged to engage or disengage said clutch selectively, a pilot valve operatively connected to control said clutch actuating mechanism and having operating positions functioning to effect engagement and disengagement of said clutch respectively, resilient means arranged to bias said valve to one of said positions, and mechanical control linkage operative selectively to force said valve to its other position in opposition to said resilient biasing means.

10. In a machine tool, a frame, a working member movably mounted on said frame, a source of power for operating said member, transmission mechanism including a hydraulically actuated disconnecting clutch operatively connected to transmit power from said source to said movable member selectively, a source of fluid pressure for actuating said clutch, a pilot valve connected to control the flow of pressure fluid to said clutch and movable to two operating positions corresponding to the engaged and disengaged positions of said clutch respectively, means resiliently urging said pilot valve to clutch engaging position, a manually actuatable clutch controlling lever, mechanical linkage operatively connecting said lever to said pilot valve in manner to provide for positively moving said valve to clutch disengaging position in opposition to said resilient means, a hydraulic control system for said machine tool, and a single hydraulic conduit leading from said control system to said pilot valve and operative to exert pressure upon said valve to move it to clutch disengaging position selectively in opposition to said resilient means and independently of said mechanical valve operating linkage.

11. In a milling machine, a bed, table receiving ways formed on the surface of said bed, a work supporting table slidably mounted on said ways for longitudinal movement therealong, a table driving nut fixed in said bed, a table driving screw threaded in said nut, means in said bed operatively connected to turn said screw in said nut, and a bearing disposed to rotatably support each end of said screw, said bearings being disposed beneath and attached to the respective ends of said table and adapted to pass between said ways on said bed, whereby the ways on said table may be fitted to match the ways on said bed in such manner that at each end of the path of travel of said table said ways will coincide without either projecting beyond the other at the trailing end of the table.

12. In a milling machine, a frame, a work supporting table slidably mounted on said frame, means to drive said table including a feed screw operatively connected to said table, a driving bracket associated with said feed screw and removably mounted on said frame, a feed nut mounted in said bracket and cooperatively threaded upon said feed screw, a reversing mechanism mounted in said bracket and operatively connected to effect relative rotation between said screw and said nut, and power driven means in said frame having a detachable connection with said reversing mechanism, whereby after removing said table from said frame said driving bracket with said reversing mechanism said nut and said screw may be removed as a unit from said frame.

13. In a milling machine, a frame, a working element slidably mounted on said frame, a driving screw operatively connected to actuate said working element, a driving bracket attached to said frame, a nut carried by said driving bracket in cooperating threaded relationship with said driving screw, and a power driven reversing mechanism carried by said driving bracket and operatively connected to effect relative rotation between said screw and said nut, the arrangement being such that said screw, said nut and said reversing mechanism may be removed from said machine as a unit with said driving bracket.

14. In a milling machine, a supporting frame, a work carrying table slidably mounted on said frame, table actuating mechanism mounted in said frame and operative to effect sliding movement of said table, trip mechanism mounted in said frame in association with said table for operation in response to movement thereof, a source of power mounted in said frame for driving said table, a table driving and controlling unit detachably mounted in said frame and arranged to transmit power from said power source to said table actuating mechanism, a power shaft having splined connection with said driving unit and operatively arranged to transmit power from said power source to said unit at rapid traverse rate, another power shaft likewise having splined connection with said driving unit and operatively arranged to transmit power from said source to said unit at feed rate, a table driving shaft having splined connection with said table actuating mechanism and connected to transmit power from said driving unit to said table actuating mechanism at either rapid traverse or feed rate as determined by the adjustment of said driving and controlling unit, control means in said unit arranged to be engaged and actuated by said trip mechanism to control the operation of said table, and means releasably retaining said driving and controlling unit in said frame, the arrangement being such that said unit may be withdrawn from said frame upon releasing said retaining means and withdrawing said splined shafts.

15. In a milling machine, a supporting frame, a work carrying table slidably mounted on said frame, table actuating mechanism mounted in said frame and operative to effect sliding movement of said table, trip mechanism mounted in said frame in association with said table for operation in response to movement thereof, a source of power mounted in said frame for driving said table, a driving and controlling unit including a pressure pump and hydraulic control mechanism detachably mounted in said frame and interposed between said power source and said table actuating mechanism, a power shaft having splined connection with said driving unit and operatively arranged to transmit power from said power source to said unit at rapid traverse rate, another power shaft likewise having splined connection with said driving unit and operatively arranged to transmit power from said source to said unit at feed rate, a table driving shaft having splined connection with said table actuating mechanism and connected to transmit power from said driving unit to said table actuating mechanism at either rapid traverse or feed rate as determined by the adjustment of said driving and controlling unit, means in said unit arranged to be engaged and actuated by said trip mechanism and operative upon said hydraulic control mechanism to control the operation of said table, and means releasably retaining said driving and controlling unit in said frame, the arrangement being such that said unit may be withdrawn from said frame upon releasing said retaining means and disengaging said splined shafts whereupon said unit and its hydraulic control mechanism may be tested apart from the machine under power supplied through a temporary connection.

16. In a milling machine comprising a frame, a working element slidably mounted on said frame, drive mechanism arranged to effect movement of said element, trip mechanism disposed on said frame in position to be actuated by said element in the course of its movement, a driving and controlling bracket detachably supported in said frame beneath said element, a vertically disposed shaft carried by said bracket and detachably connected with said element driving mechanism, feed and rapid traverse clutch means on said vertical shaft arranged to drive it selectively at feed rate or at rapid traverse rate, and a hydraulic control unit mounted in said bracket in position to be operated by said trip mechanism on said frame and connected to control said feed and rapid traverse clutch means, the arrangement being such that said bracket together with said control unit and said table driving unit may be removed from said frame as a unitary structure for testing and servicing.

17. In a milling machine, a frame, a work supporting table slidably mounted on said frame, a table driving screw, bearings on the ends of said screw, means detachably securing said bearings to the respective ends of said table, a table driving unit including a nut disposed to cooperate with said screw and a driving and reversing mechanism connected to turn said screw in either direction selectively, power driven means detachably connected to actuate said reversing mechanism, and means detachably securing said table driving unit to said frame, whereby said table driving unit together with said screw and its bearings may be removed from said frame as a unit after said table has been removed.

18. In a milling machine, a frame, a pair of ways disposed horizontally in spaced relationship on said frame, a work supporting table having spaced ways corresponding to and cooperating with said ways on said frame and provided at its ends with sockets between said ways, a rotatable table driving screw disposed beneath said table between its ways, bearings on the ends of said screw to support it for rotation, and means securing said bearings in said sockets at the ends of said table, the arrangement being such that the table ways extend the entire length of the table in such manner as to overlie and protect all parts of said ways on said frame.

19. In a machine tool having a driven member, a source of power for driving said member, a hydraulically actuated clutch arranged to connect said source of power to said member to drive it, a pilot valve operatively connected to control said clutch, means biasing said pilot valve to clutch engaging position, hydraulic pressure means operative selectively to exert force upon said pilot valve to move it to clutch disengaging position in opposition to said biasing means, and a manually operated mechanical linkage operative selectively to force said pilot valve positively to clutch disengaging position.

20. In a machine tool, a frame, a working element movably mounted on said frame, transmission mechanism arranged to effect movement of said working element in either direction selectively, hydraulic actuating mechanism operatively connected to adjust said transmission mechanism, a reversing valve connected to control said hydraulic actuating mechanism, an actuating cylinder formed at each end of said reversing valve, a reversing plunger valve connected to each of said actuating cylinders, and trip mechanism arranged to be actuated by said working element in the course of its movement and operative upon one or the other of said reversing plunger valves alternatively to effect pressure operation of said reversing valve in manner to cause reversing actuation of said transmission mechanism.

JOSEPH B. ARMITAGE.
ORRIN W. BARKER.